(12) United States Patent
Tiwari

(10) Patent No.: US 12,472,813 B1
(45) Date of Patent: Nov. 18, 2025

(54) SYSTEMS AND METHODS FOR MACHINE-LEARNING POWERED ALCOHOL IMPAIRMENT DETECTION AND REAL-TIME MONITORING IN AUTOMOTIVE SYSTEMS

(71) Applicant: FCA US LLC, Auburn Hills, MI (US)

(72) Inventor: Rajeev Tiwari, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/973,177

(22) Filed: Dec. 9, 2024

(51) Int. Cl.
| | |
|---|---|
| B60K 28/06 | (2006.01) |
| A61B 5/00 | (2006.01) |
| A61B 5/18 | (2006.01) |
| G06V 20/59 | (2022.01) |

(52) U.S. Cl.
CPC .............. B60K 28/066 (2013.01); A61B 5/18 (2013.01); A61B 5/4845 (2013.01); A61B 5/6893 (2013.01); A61B 5/7264 (2013.01); A61B 5/746 (2013.01); G06V 20/597 (2022.01)

(58) Field of Classification Search
CPC ...... B60K 28/063; B60K 28/06; B60K 28/00; B60W 2540/24; B60W 2040/0836; B60W 2540/043; B60W 2040/0809; B60W 2040/0845; B60W 2040/0872; G06V 20/597; G06V 40/70
See application file for complete search history.

(56) References Cited

U.S. PATENT DOCUMENTS

| | | | | |
|---|---|---|---|---|
| 8,981,942 | B2* | 3/2015 | He | G06Q 40/08 |
| | | | | 340/576 |
| 9,751,534 | B2* | 9/2017 | Fung | G06V 10/764 |
| 10,074,024 | B2* | 9/2018 | el Kaliouby | G06V 20/597 |
| 10,789,973 | B2 | 9/2020 | Kane et al. | |
| 10,867,197 | B2* | 12/2020 | el Kaliouby | B60R 11/04 |
| 10,875,536 | B2* | 12/2020 | Fung | B62D 6/007 |
| 11,840,246 | B2* | 12/2023 | Bielby | B60W 50/085 |
| 2017/0166054 | A1 | 6/2017 | Ayala Rodriguez et al. | |
| 2019/0217865 | A1 | 7/2019 | Nothacker et al. | |
| 2023/0044733 | A1* | 2/2023 | Jung | G06V 40/10 |
| 2023/0294514 | A1* | 9/2023 | Mohanty | A61B 5/14546 |
| | | | | 180/272 |
| 2024/0424862 | A1* | 12/2024 | Stout, II | B60H 1/00871 |
| 2025/0100482 | A1* | 3/2025 | Al-Ali | B60K 35/60 |

FOREIGN PATENT DOCUMENTS

CN 112572455 A 3/2021

* cited by examiner

*Primary Examiner* — Paul N Dickson
*Assistant Examiner* — Tiffany L Webb
(74) *Attorney, Agent, or Firm* — Jeremy J. Klobucar

(57) ABSTRACT

A driver alcohol impairment detection and control system and method for a vehicle a control system configured to access an alcohol impairment detection model, wherein the alcohol impairment detection model is a machine-learning model trained based on a plurality of input parameters including at least (i) parameters of one or more eyes of the driver, (ii) skin conductance of a face of the driver, and (iii) responsiveness of the driver, receive a set of captured images of the driver from a driver monitoring camera system and a set of driver inputs via one or more driver input device sensors, determine whether the driver is impaired by alcohol using the alcohol impairment detection model, the set of captured images, and the set of driver inputs, and perform remedial control of at least one output of the vehicle when the driver is determined to be impaired by alcohol.

14 Claims, 2 Drawing Sheets

SYSTEMS AND METHODS FOR MACHINE-LEARNING POWERED ALCOHOL IMPAIRMENT DETECTION AND REAL-TIME MONITORING IN AUTOMOTIVE SYSTEMS

FIELD

The present application generally relates to automotive driver alcohol impairment detection and, more particularly, to systems and methods for machine-learning powered alcohol impairment detection and real-time monitoring in automotive systems.

BACKGROUND

Automotive driver alcohol impairment or "drunk driving" is a very serious and costly problem worldwide, resulting in significant quantities of accidents, injuries, and deaths each year. The most accurate alcohol impairment detection techniques are intrusive breath and blood testing, which is used by law enforcement after-the-fact and is not feasible for general automotive implementation. Some non-intrusive automotive alcohol impairment detection systems have been developed, but these systems suffer from false positive detections (and, in turn, dissatisfied customers) as well as false negative detections, which could result in alcohol impaired driver automobile operation. Accordingly, while such conventional automotive driver alcohol impairment detection systems do work for their intended purpose, there exists an opportunity for improvement in the relevant art.

SUMMARY

According to one example aspect of the invention, a driver alcohol impairment detection and control system for a vehicle is presented. In one exemplary implementation, the driver alcohol impairment detection and control system comprises a plurality of sensor systems including at least a driver monitoring camera system and one or more driver input device sensors and a control system configured to access an alcohol impairment detection model, wherein the alcohol impairment detection model is a machine-learning model trained based on a plurality of input parameters including at least (i) parameters of one or more eyes of the driver, (ii) skin conductance of a face of the driver, and (iii) responsiveness of the driver, receive, from the plurality of sensor systems, a set of captured images of the driver from the driver monitoring camera system and a set of driver inputs via the one or more driver input device sensors, determine whether the driver is impaired by alcohol using the alcohol impairment detection model, the set of captured images, and the set of driver inputs, and perform remedial control of at least one output of the vehicle when the driver is determined to be impaired by alcohol.

In some implementations, the alcohol impairment detection model is trained to define threshold levels for pupil dilation of one or more eyes of an average or aggregate driver, skin conductance of a face of the average or aggregate driver, and responsiveness of the average or aggregate driver. In some implementations, the parameters of the one or more eyes of the driver include at least one of (i) pupil dilation and (ii) movement or gaze change frequency. In some implementations, the skin conductance is indicative of a level of facial perspiration by the driver.

In some implementations, the set of input device sensors includes a steering wheel sensor and the responsiveness of the driver is based on at least a driver delay in providing steering input to the vehicle to maintain a heading of the vehicle between a pair of lane lines. In some implementations, the set of input device sensors includes a brake pedal sensor and the responsiveness of the driver is based on a driver delay in providing brake input to the vehicle to slow the vehicle before a potential collision with a nearby object. In some implementations, the alcohol impairment detection model is pre-trained offline by an original equipment manufacturer (OEM) of the vehicle.

In some implementations, the remedial control includes the control system outputting a warning message or alert to the driver. In some implementations, the remedial control includes the control system taking over control of the vehicle to move the vehicle to a safe position and thereafter temporarily disabling the vehicle from operation by the driver. In some implementations, the control system is further configured to initially prompt the driver for an opt-in and, in response to receiving the opt-in, authorize the use of the alcohol impairment detection and control system thereafter.

According to another example aspect of the invention, a driver alcohol impairment detection and control method for a vehicle is presented. In one exemplary implementation, the driver alcohol impairment detection and control method comprises providing a plurality of sensor systems of the vehicle, the plurality of sensor systems including at least a driver monitoring camera system and one or more driver input device sensors, accessing, by a control system of the vehicle, an alcohol impairment detection model, wherein the alcohol impairment detection model is a machine-learning model trained based on a plurality of input parameters including at least (i) parameters of one or more eyes of the driver, (ii) skin conductance of a face of the driver, and (iii) responsiveness of the driver, receiving, by the control system and from the plurality of sensor systems, a set of captured images of the driver from the driver monitoring camera system and a set of driver inputs via the one or more driver input device sensors, determining, by the control system, whether the driver is impaired by alcohol using the alcohol impairment detection model, the set of captured images, and the set of driver inputs, and performing, by the control system, remedial control of at least one output of the vehicle when the driver is determined to be impaired by alcohol.

In some implementations, the alcohol impairment detection and control method further comprises training the alcohol impairment detection model to define threshold levels for pupil dilation of one or more eyes of an average or aggregate driver, skin conductance of a face of the average or aggregate driver, and responsiveness of the average or aggregate driver. In some implementations, the parameters of the one or more eyes of the driver include at least one of (i) pupil dilation and (ii) movement or gaze change frequency. In some implementations, the skin conductance is indicative of a level of facial perspiration by the driver.

In some implementations, the set of input device sensors includes a steering wheel sensor and the responsiveness of the driver is based on at least a driver delay in providing steering input to the vehicle to maintain a heading of the vehicle between a pair of lane lines. In some implementations, the set of input device sensors includes a brake pedal sensor and the responsiveness of the driver is based on a driver delay in providing brake input to the vehicle to slow the vehicle before a potential collision with a nearby object. In some implementations, the alcohol impairment detection model is pre-trained offline by an original equipment manufacturer (OEM) of the vehicle.

In some implementations, the remedial control includes the control system outputting a warning message or alert to the driver. In some implementations, the remedial control includes the control system taking over control of the vehicle to move the vehicle to a safe position and thereafter temporarily disabling the vehicle from operation by the driver. In some implementations, the alcohol impairment detection and control method further comprises initially prompting, by the control system, the driver for an opt-in and, in response to receiving, by the control system, the opt-in, authorizing the use of an alcohol impairment detection and control system thereafter.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

Figure 1:
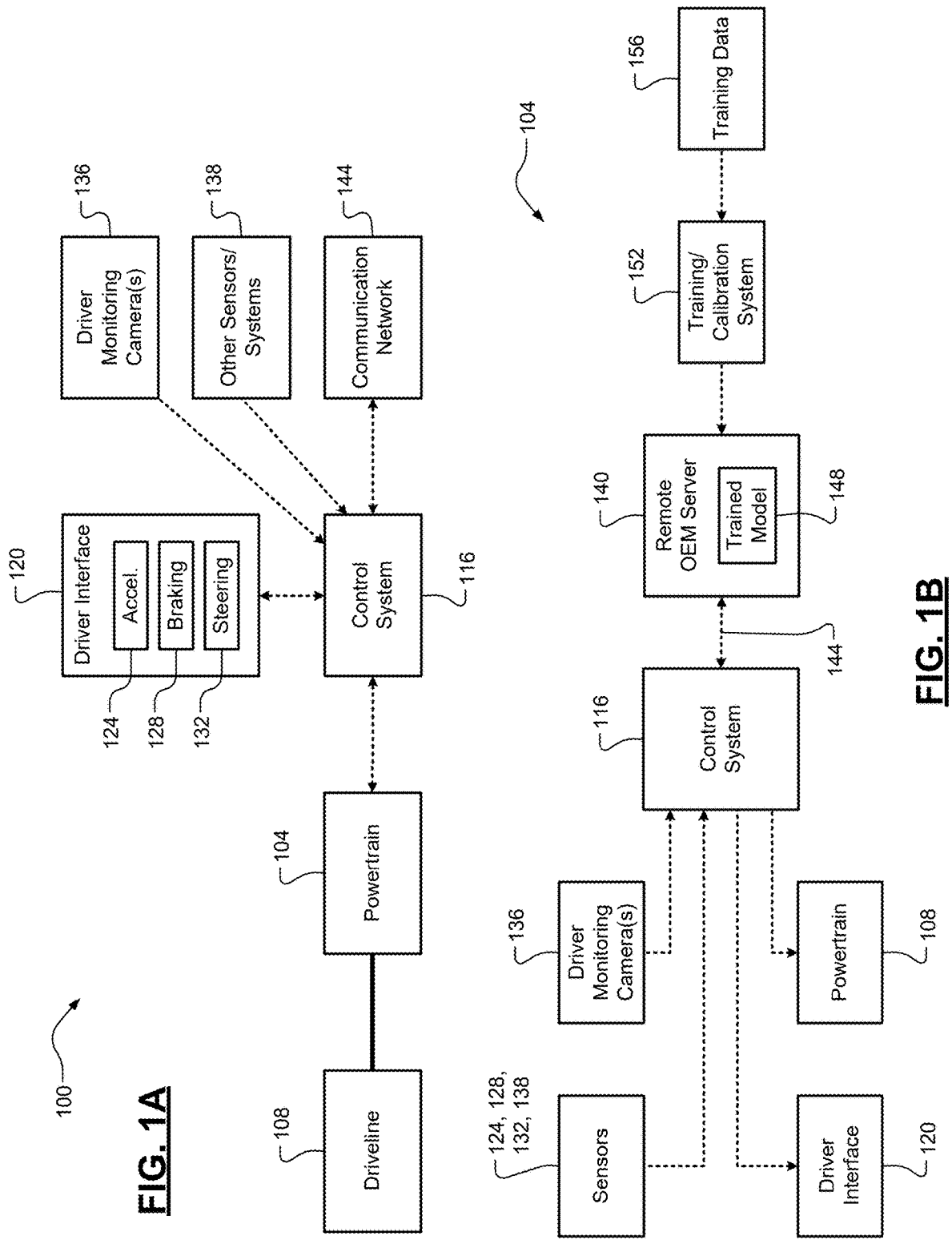
FIGS. 1A-1B are functional block diagrams of a vehicle and example driver alcohol impairment detection and control system for the vehicle according to the principles of the present application.

As previously discussed, automotive driver alcohol impairment or "drunk driving" is a very serious and costly problem worldwide, resulting in significant quantities of accidents, injuries, and deaths each year. The most accurate alcohol impairment detection techniques are intrusive breath and blood testing, which is used by law enforcement after-the-fact and is not feasible for general automotive implementation. Some non-intrusive automotive alcohol impairment detection systems have been developed, but these systems suffer from both false positive and false negative detections. False positive detections include, for example, (i) detecting alcohol impairment when none exists, potentially due to sensor inaccuracies or overly sensitive algorithms, and (ii) misinterpreting other conditions (e.g., fatigue, medical conditions) as alcohol impairment. False negative detections include, for example, (i) failing to detect actual impairment, allowing intoxicated drivers to operate vehicles, and (ii) Insufficiently sensitive detection methods or thresholds set too high. Thus, an opportunity for improvement exists in the relevant art.

Accordingly, improved systems and methods for machine-learning powered alcohol impairment detection and real-time monitoring in automobile systems are presented herein. These systems and methods leverage the capabilities of high-performance driver monitoring cameras that are included in many of today's automobiles. These cameras are conventionally used for monitoring the state or behavior of a driver of the automobile, such as to verify sufficient driver engagement (eye gaze direction, alertness, etc.). These cameras can also detect other parameters that are indicative of alcohol impairment, such as pupil size/dilation, eye movement, and facial conductance (e.g., sweat or perspiration). In addition to these driver facial parameters, other parameters could also be monitored to detect alcohol impairment, such as driver head/neck angle, driver posture, and the driver's responsiveness to other road conditions (e.g., steering, braking, etc.).

Based on the above-described parameters, a machine-learning alcohol impairment detection model can be trained using data collected from a fleet of original equipment manufacturer (OEM) vehicles and can be further updated/enhanced over time to provide very accurate alcohol impairment detection. Leveraging data collected over a full fleet of OEM vehicles provides an ample amount of training data to achieve a higher performing (e.g., more accurate) alcohol impairment detection model. The trained alcohol impairment detection model could then be deployed on some or all OEM vehicles and utilized to provide real-time driver alcohol impairment detection. In some implementations, driver opt-in may be required to authorize the use of the system. Various different driver alerts and actions could be taken in response to a positive alcohol impairment detection, including issuing driver warnings and, in some cases, an automated takeover of the vehicle to move the vehicle to a safe position (e.g., a side of the road) whereafter the vehicle could be temporarily disabled (e.g., from further propulsive operation by the driver).

Referring now to FIGS. 1A-1B, functional block diagrams of a vehicle 100 and an example driver alcohol impairment detection and control system 104 according to the principles of the present application are illustrated. The vehicle 100 generally comprises a powertrain 108 configured to generate and transfer torque to a driveline 112 for vehicle propulsion. Non-limiting examples of the component(s) of the powertrain 108 include an electric motor, an internal combustion engine, a battery system, a fuel cell system, a transmission or gear reducer, and combinations thereof. The vehicle 100 is controlled by a control system 116, which typically includes a plurality of electronic control units (ECUs) connected and in communication via a controller area network (CAN) or similar network (not shown). The control system 116 primarily controls the powertrain 108 to generate a desired amount of drive torque to satisfy a driver torque request provided by a driver via a driver interface 120 (e.g., an accelerator pedal/sensor 124). The driver interface 120 further includes a brake pedal/sensor 128 and a steering wheel/sensor 132. These are merely example sensors/systems used as inputs to the control system 116 and it will be appreciated that the control system 116 could receive other inputs from other sensors/systems 138 (speed and acceleration sensors, vehicle position/navigations systems, other vehicle perception and proximity sensors/systems, etc.) as discussed more below.

The vehicle 100 also includes a driver monitoring camera system 136 configured to capture images or video streams of the driver inside the vehicle 100 (e.g., while sitting behind the steering wheel and in the driver's seat). The driver monitoring camera system 136 comprises one or more high-resolution (e.g., 1080p at 30 frames per second, or FPS) cameras, which could also be equipped with infrared (IR) capabilities for low-light usage. The control system 116 is also configured to communicate (e.g., using a communication system or transceiver, not shown) with one or more remote devices, such as a remote OEM server 140, via a communication network 144 (e.g., a cellular or satellite network). As shown in FIG. 1B, the OEM server 140 is configured to receive and store (e.g., in memory, not shown) a trained alcohol impairment detection model 148. This alcohol impairment detection model is a machine-learning model (e.g., a convolutional neural network type model) that is trained by a separate training or calibration system 152 based on a large amount of training data 156 (e.g., sample driver images and sample driver response data for both intoxicated/impaired and unimpaired drivers). This training data 156 could be collected, for example, from a fleet of other OEM vehicles. The training data generation could be generated in a controlled environment in order to obtain training data for intoxicated/impaired drivers without disturbing the public or otherwise creating an unsafe environment.

As previously discussed, some of the key or critical input parameters to the trained alcohol impairment detection model 148 include (i) parameters of one or more eyes of the driver, (ii) skin conductance of a face of the driver, and (ii) responsiveness of the driver. One or more eyes of the driver are specifically recited as the driver could have only one eye or only a single eye may be recognizable via the captured images. The skin conductance of the face of the driver indicates a degree or level of perspiration of the driver's facial skin, as alcohol consumption tends to increase body temperature and make users more flush/red in their face. The parameters of the user eye(s) can include both pupil dilation, which increases with alcohol consumption, as well as eye movement (gaze direction and frequency of gaze change). While these are some specific parameters that should be utilized by the trained alcohol impairment detection model 148, it will be appreciated that other inputs could be considered, such as unexpected head movements (e.g., head bobbing) of the driver and/or changes in posture of the driver (e.g., slouching). In this part of the algorithm, deep-learning models can be built to evaluate face flushing, drooping eyelids, and other visual clues that indicate alcohol impairment or driver drunkenness.

Driver responsiveness is also another critical input or parameter for the trained alcohol impairment detection model 148. For example, steering corrections by the driver as measured by sensor 132 could be classified as either odd or delayed. The system continuously monitors the driver's behavior and performance, allowing for early detection of impairment and early warnings via appropriate notifications. In addition, the program will gather and evaluate data regarding the utilization of pedals. The algorithm can discover anomalies in the inputs of the accelerator and brake pedals by tracking the patterns of pedal usage via the respective sensors 124, 128. These irregular patterns could include delayed reactions or excessive actuation compared to a normal or unintoxicated driver. Lateral position monitoring (lane departure frequency and swerving detection) could also be implemented. The approach could be to enable camera-based lane detection systems (e.g., advanced driver-assistance, or ADAS, or autonomous driving features), such as lane keeping/centering, which would allow for the quantification of the frequency and severity of lane departures. To identify anomalous swerving behavior, other non-illustrated sensors such as accelerometers and gyroscopes could be implemented to detect the lateral acceleration and yaw rate of the vehicle 100.

There are certain circumstances in which the system 104 will be able to detect odd patterns of acceleration and braking, and it will be able to provide drivers with a warning about the behavior or patterns. As a result of the analysis of data from speed sensors and measurements of brake pressure, inconsistencies in vehicle control can be identified, which may be helpful for the configuration of the system. A connection could also be made to the algorithm in order to check for consistency in speed maintenance. Data will be collected from a global positioning satellite (GPS) system (not shown) and a vehicle speedometer in order to assess the driver's ability to maintain a consistent speed or abrupt pattern, and notifications will be sent on the results of this evaluation. Lastly, the algorithm will also be used to check the driver's reaction time, i.e. the amount of time it takes for users to react to traffic signals and signs. This response will be watched and measured. The proposed solution would involve the incorporation of forward-facing cameras and map data, which would enable the evaluation of how drivers react to road signals. The algorithm will analyze data from range detection and ranging (RADAR) and, when implemented, light detection and ranging (LIDAR) sensor systems, and the system will evaluate the timeliness and appropriateness of evasive maneuvers. This is because all of this data has already been recorded.

Figure 2:
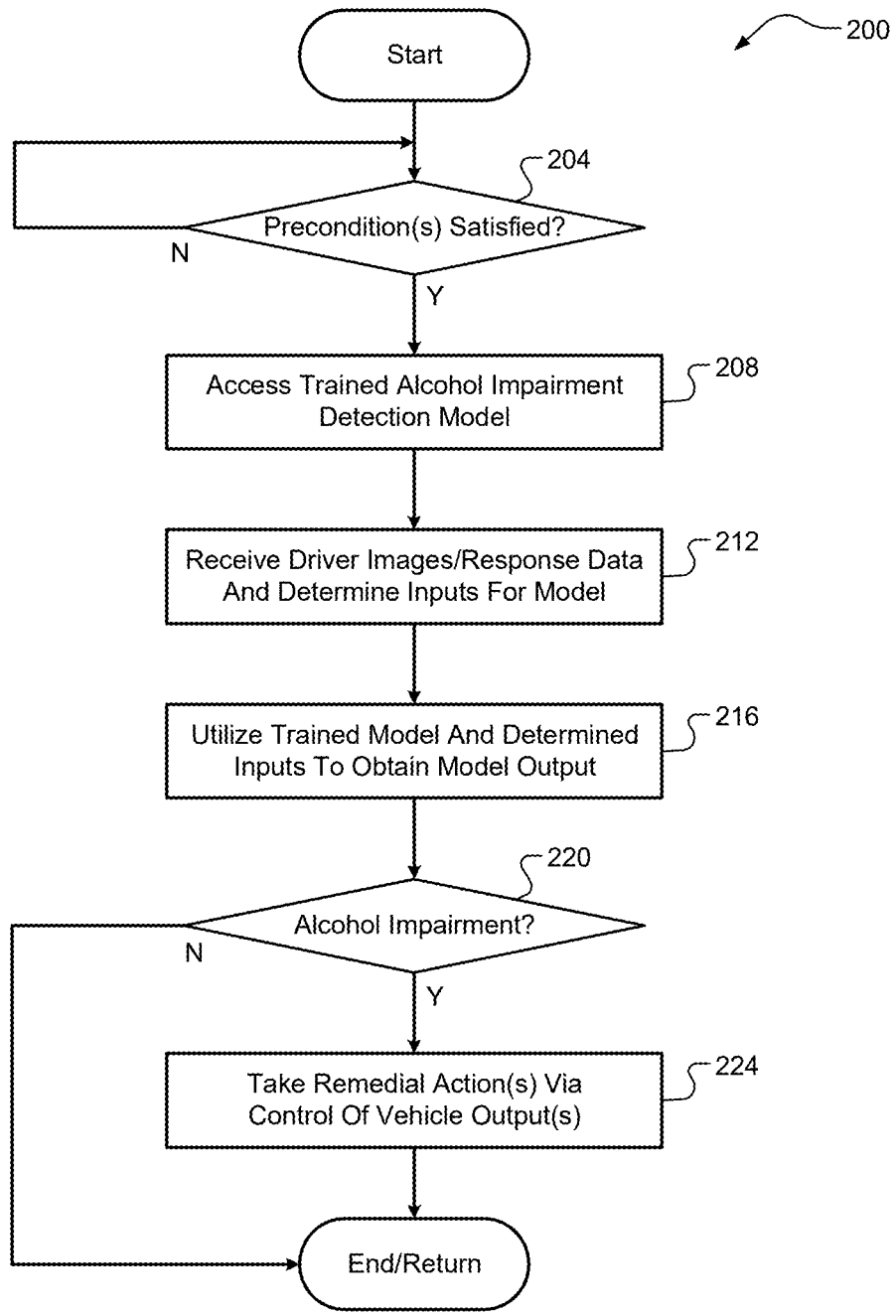
FIG. 2 is a flow diagram of an example driver alcohol impairment detection and control method for a vehicle according to the principles of the present application.

Referring now to FIG. 2 and with continued reference to FIGS. 1A-1B, a flow diagram of an example driver alcohol impairment detection and control method according to the principles of the present application is illustrated. While the method 200 specifically references the vehicle 100 and its components for descriptive/illustrative purposes, it will be appreciated that the method 200 could be applicable to any suitably configured vehicle (e.g., a vehicle having a sufficiently capable driver monitoring camera system). The method 200 begins at 204 where the control system 116 determines whether an optional set of one or more preconditions are satisfied. These precondition(s) could include, for example only, the vehicle 100 being powered up and operational and having no malfunctions or faults present that would negatively impact or otherwise inhibit the operation of the techniques of the present application. The precondition(s) could also include, for example only, the control system 116 having previously received an opt-in by the driver to utilize the alcohol impairment detection and control features of the present application. When false, the method 200 ends or returns to 204. When true, the method 200 proceeds to 208. At 208, the control system 116 accesses the trained alcohol impairment detection model 148 (e.g., at the remote OEM server 152).

At 212, the control system 116 receives captured images from the driver monitoring camera system 136 and the driver input device sensors 124, 128, and 132 and determines parameters for input to the trained alcohol impairment detection model 148 as previously described herein. At 216, the control system 116 uses the trained alcohol impairment detection model 148 and the determined inputs to generate a model output. This could include, for example, an alcohol impairment score, which could then be compared to one or more thresholds at 220 to determine whether the driver is impaired by alcohol. Different thresholds could be utilized as different levels of alcohol impairment are allowed by different regions/countries. In some cases, the driver could be determined to be impaired by alcohol even though their actual blood alcohol concentration (BAC) level is less than or equal to the legal threshold that is considered operating-while-impaired by alcohol in the region/country of operation (e.g., 0.08% in many jurisdictions of the United States). When the driver is determined to be impaired by alcohol at 220, the method 200 proceeds to 224 for remedial action(s). Otherwise, the method 200 ends (i.e., normal vehicle operation can continue). At 224, the control system 116 performs remedial control of one or more outputs of the vehicle 100.

This could include, for example, controlled outputs of increasing severity depending on the driver's response (or lack of response) thereto.

When it comes to classifying impairment levels, time-series data can be processed from many sensors and deep-learning models that are currently accessible can be optimized. Some examples of these models include long-short-term memory (LSTM) networks. Providing users with the ability to take appropriate actions and prevent accidents by providing real-time processing and alert generation will be of great assistance. Currently, edge computing devices are capable of providing low-latency processing and rapid response to observed impairments. Additionally, these devices help deliver actionable knowledge within milliseconds, which enables quick decisions to be made. In addition to this, the algorithm considers the effects that vehicle vibration can have on sensor readings. The primary goal of the system 104 is to develop prediction models for proactive intervention. It is possible to discover patterns that are suggestive of future impairment with the assistance of this model, which enables preventative steps to be taken before the driver becomes intoxicated. End-to-end encryption, such as AES-256, and data anonymization techniques can also be incorporated into the present techniques to safeguard the confidentiality and authenticity of the driver.

In summary, the development of sophisticated techniques for the detection and monitoring of alcohol impairment in automotive applications constitutes a significant step forward in the field of road safety. The proposed techniques will have the potential to significantly reduce the number of traffic accidents that are caused by alcohol by combining several different sensor technologies, advanced data analysis techniques, and intelligent system integration. The proposed techniques are comprised of essential technologies such as sensor data analysis, motion-based sensors, and driver behavior monitoring. When combined with artificial intelligence (AI) driven decision-making techniques, the proposed techniques offer a comprehensive approach to the detection of impairments. It is possible to achieve effective intervention through the integration of these systems with the controls of the vehicle and the user interfaces involved. Even though there may still be obstacles to overcome in terms of accuracy, user acceptance, and legal/government adherence and other considerations, the proposed techniques have demonstrated positive results in detecting certain use cases and, as described, can continue to undergo continuous improvement.

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A driver alcohol impairment detection and control system for a vehicle, the driver alcohol impairment detection and control system comprising:
    a plurality of sensor systems including at least a driver monitoring camera system and one or more driver input device sensors; and
    a control system configured to:
        access an alcohol impairment detection model, wherein the alcohol impairment detection model is a machine-learning model trained based on a plurality of input parameters including at least:
            (i) parameters of one or more eyes of the driver,
            (ii) skin conductance of a face of the driver, and
            (iii) responsiveness of the driver;
        receive, from the plurality of sensor systems, a set of captured images of the driver from the driver monitoring camera system and a set of driver inputs via the one or more driver input device sensors;
        determine whether the driver is impaired by alcohol using the alcohol impairment detection model, the set of captured images, and the set of driver inputs; and
        perform remedial control of at least one output of the vehicle when the driver is determined to be impaired by alcohol, wherein the remedial control includes the control system outputting a warning message or alert to the driver and the control system taking over control of the vehicle to move the vehicle to a safe position and thereafter temporarily disabling the vehicle from operation by the driver.

2. The alcohol impairment detection and control system of claim 1, wherein the alcohol impairment detection model is trained to define threshold levels for pupil dilation of one or more eyes of an average or aggregate driver, skin conductance of a face of the average or aggregate driver, and responsiveness of the average or aggregate driver.

3. The alcohol impairment detection and control system of claim 2, wherein the parameters of the one or more eyes of the driver include at least one of (i) pupil dilation and (ii) movement or gaze change frequency.

4. The alcohol impairment detection and control system of claim 2, wherein the skin conductance is indicative of a level of facial perspiration by the driver.

5. The alcohol impairment detection and control system of claim 2, wherein the set of input device sensors includes a steering wheel sensor and the responsiveness of the driver is based on at least a driver delay in providing steering input to the vehicle to maintain a heading of the vehicle between a pair of lane lines.

6. The alcohol impairment detection and control system of claim 2, wherein the set of input device sensors includes a brake pedal sensor and the responsiveness of the driver is based on a driver delay in providing brake input to the vehicle to slow the vehicle before a potential collision with a nearby object.

7. The alcohol impairment detection and control system of claim 2, wherein the alcohol impairment detection model is pre-trained offline by an original equipment manufacturer (OEM) of the vehicle.

8. A driver alcohol impairment detection and control method for a vehicle, the driver alcohol impairment detection and control method comprising:
    providing a plurality of sensor systems of the vehicle, the plurality of sensor systems including at least a driver monitoring camera system and one or more driver input device sensors;

accessing, by a control system of the vehicle, an alcohol impairment detection model, wherein the alcohol impairment detection model is a machine-learning model trained based on a plurality of input parameters including at least:
- (i) parameters of one or more eyes of the driver,
- (ii) skin conductance of a face of the driver, and
- (iii) responsiveness of the driver;

receiving, by the control system and from the plurality of sensor systems, a set of captured images of the driver from the driver monitoring camera system and a set of driver inputs via the one or more driver input device sensors;

determining, by the control system, whether the driver is impaired by alcohol using the alcohol impairment detection model, the set of captured images, and the set of driver inputs; and performing, by the control system, remedial control of at least one output of the vehicle when the driver is determined to be impaired by alcohol, wherein the remedial control includes the control system outputting a warning message or alert to the driver and the control system taking over control of the vehicle to move the vehicle to a safe position and thereafter temporarily disabling the vehicle from operation by the driver.

9. The alcohol impairment detection and control method of claim 8, further comprising training the alcohol impairment detection model to define threshold levels for pupil dilation of one or more eyes of an average or aggregate driver, skin conductance of a face of the average or aggregate driver, and responsiveness of the average or aggregate driver.

10. The alcohol impairment detection and control method of claim 9, wherein the parameters of the one or more eyes of the driver include at least one of (i) pupil dilation and (ii) movement or gaze change frequency.

11. The alcohol impairment detection and control method of claim 9, wherein the skin conductance is indicative of a level of facial perspiration by the driver.

12. The alcohol impairment detection and control method of claim 9, wherein the set of input device sensors includes a steering wheel sensor and the responsiveness of the driver is based on at least a driver delay in providing steering input to the vehicle to maintain a heading of the vehicle between a pair of lane lines.

13. The alcohol impairment detection and control method of claim 9, wherein the set of input device sensors includes a brake pedal sensor and the responsiveness of the driver is based on a driver delay in providing brake input to the vehicle to slow the vehicle before a potential collision with a nearby object.

14. The alcohol impairment detection and control method of claim 9, wherein the alcohol impairment detection model is pre-trained offline by an original equipment manufacturer (OEM) of the vehicle.

* * * * *